United States Patent [19]
Woerner

[11] Patent Number: 5,133,593
[45] Date of Patent: Jul. 28, 1992

[54] AIR BRAKE SYSTEM HAVING AN ANTI-SKID APPARATUS

[75] Inventor: Dieter Woerner, Pleidelsheim, Fed. Rep. of Germany

[73] Assignee: Robert Bosch GmbH, Stuttgart, Fed. Rep. of Germany

[21] Appl. No.: 569,049

[22] Filed: Aug. 17, 1990

[30] Foreign Application Priority Data

Sep. 13, 1989 [DE] Fed. Rep. of Germany ....... 3930568

[51] Int. Cl.⁵ .......................... B60T 8/32; B60T 13/26
[52] U.S. Cl. .................... 303/118; 303/119 R
[58] Field of Search .......... 303/113, 118, 119, 119 SV, 303/119 R, 113 R

[56] References Cited

U.S. PATENT DOCUMENTS

| | | | |
|---|---|---|---|
| 3,753,599 | 8/1973 | Michellone et al. | 303/119 |
| 3,826,542 | 7/1974 | Peruglia | 303/119 |
| 4,025,127 | 5/1977 | Rembold | 303/118 |
| 4,035,034 | 7/1977 | Sekiguchi | 303/119 |
| 4,141,595 | 2/1979 | Leiber | 303/119 |
| 4,196,941 | 4/1980 | Goebels | 303/119 |
| 4,585,278 | 4/1986 | Grauel et al. | 303/119 |
| 4,903,576 | 2/1990 | Hofler et al. | 91/459 |
| 4,943,123 | 7/1990 | Takeda et al. | 303/119 |
| 5,004,300 | 4/1991 | Brearley et al. | 303/118 |

FOREIGN PATENT DOCUMENTS 3928388  3/1991  Fed. Rep. of Germany.

Primary Examiner—Matthew C. Graham
Attorney, Agent, or Firm—Edwin E. Greigg; Ronald E. Greigg

[57] ABSTRACT

An air brake system having an anti-skid apparatus, which is provided with a switch unit including a relay valve and a magnetic valve device. In the region of the switch unit there is a separate flow line with which control pressure can be short-circuited with the brake pressure in a pressure maintenance phase. This largely prevents lagging of the brake pressure relative to the control pressure.

6 Claims, 5 Drawing Sheets

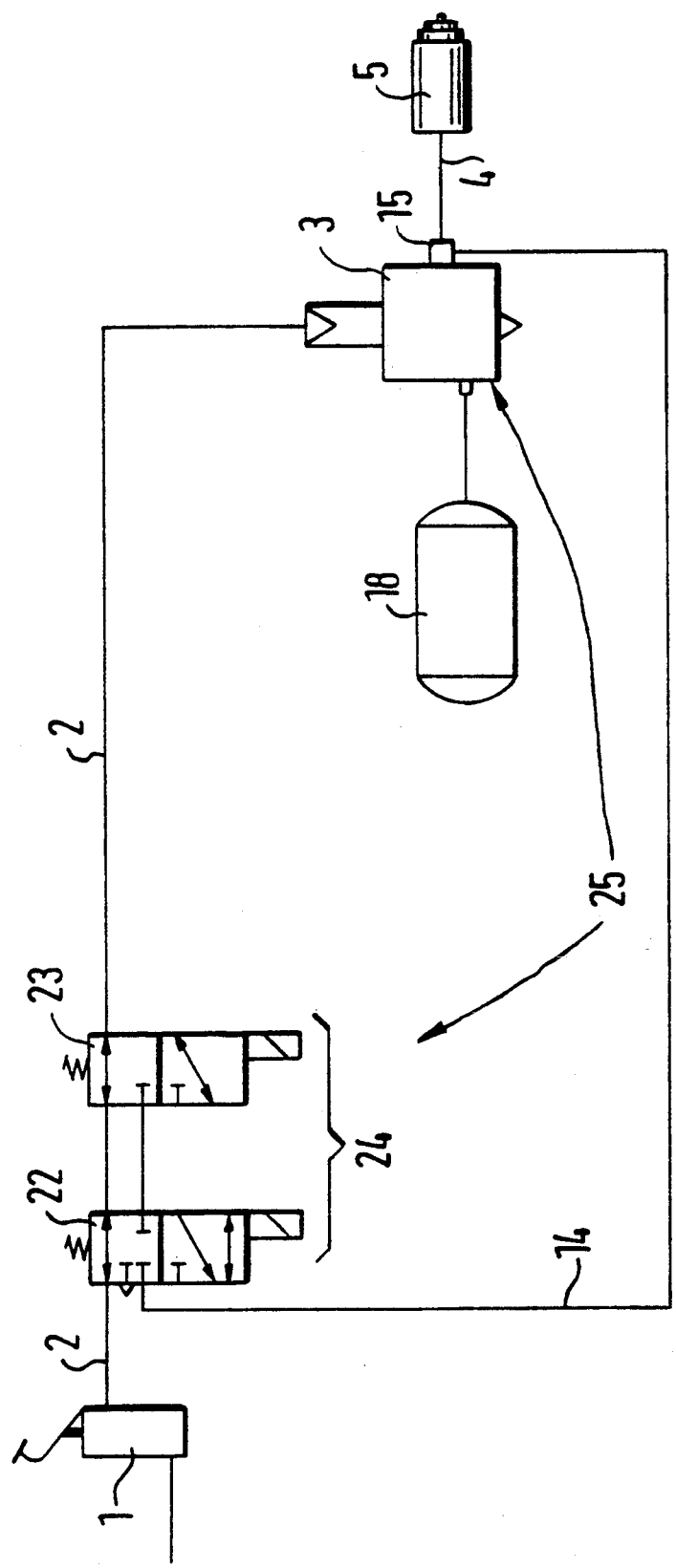

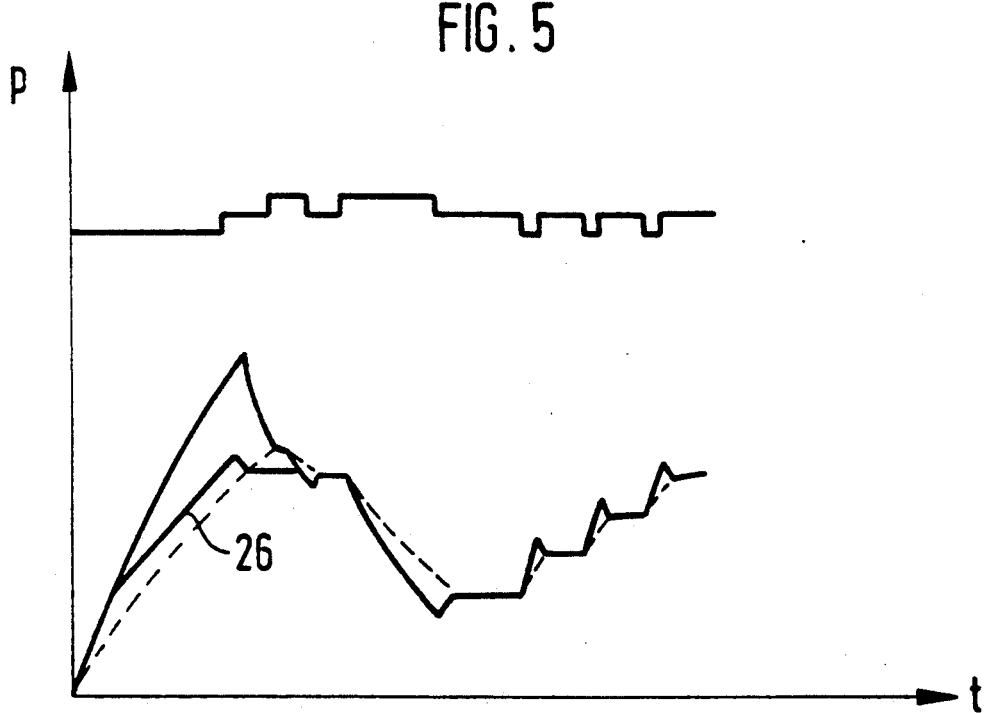

AIR BRAKE SYSTEM HAVING AN ANTI-SKID APPARATUS

BACKGROUND OF THE INVENTION

The invention is based on an air brake system as defined hereinafter. An air brake system of this kind has been set forth in U.S. Pat. No. 4,903,576.

In such air brake systems, the problem exists that particularly in the brake pressure increase phase before the onset of regulation by the anti-skid apparatus, severe differences in synchronization between the control pressure and the brake pressure arise. If the anti-skid apparatus begins to operate during overly forceful braking, "pressure maintenance" in the control pressure chamber of the relay valve is entirely unable to effect any "pressure maintenance" in the brake pressure chamber of the relay valve. As a result, the brake pressure in a pressure maintenance phase rises further, so that at the onset of operation of the anti-skid apparatus, very pronounced intrusions upon vehicle wheel speed often occur. At the very least, this puts the motor vehicle at risk during cornering, i.e., when the greatest lateral traction is required.

A similar effect arises in the brake pressure reduction phase, if the pressure in the control chamber of the relay valve is lowered via the magnetic valves; this pressure reduction then ensues more rapidly than the pressure reduction in the brake line.

OBJECT AND SUMMARY OF THE INVENTION

The air brake system described at the outset above has an advantage over the prior art that the brake pressure is largely adapted to the control pressure. There is also a further advantage that the pressure gradient in the control chamber need not be matched to the pressure gradient in the brake line. Instead, during braking, a much higher pressure gradient can be achieved in the control chamber, and as a result, with the then greater controlling of the relay valve, a higher pressure gradient is produced in the brake line.

Substantially more direct control—or in other words with less lagging, is achieved, and this control with the magnetic valves and the relay valve can be performed by the same ABS control algorithm as in the case of normal controls. It is accordingly important that the apparatus according to the invention does not necessitate any special signal processing means, and accordingly an electronic control unit of a known type that is usual for other anti-skid brakes can therefore be used here as well.

A further improvement resides in a relay valve such as has been set forth in German patent application No. P 39 28 388.7.

The invention will be better understood and further objects and advantages thereof will become more apparent from the ensuing detailed description of preferred embodiments taken in conjunction with the drawings.

BRIEF DESCRIPTION OF THE DRAWINGS

FIG. 3 shows a switch unit having one 5/2-way and one 3/2-way magnetic valve;

FIG. 4 shows a table pertaining to FIG. 3;

FIG. 5 is a diagram showing a pressure course for another embodiment;

DESCRIPTION OF THE PREFERRED EMBODIMENTS

Figure 1:
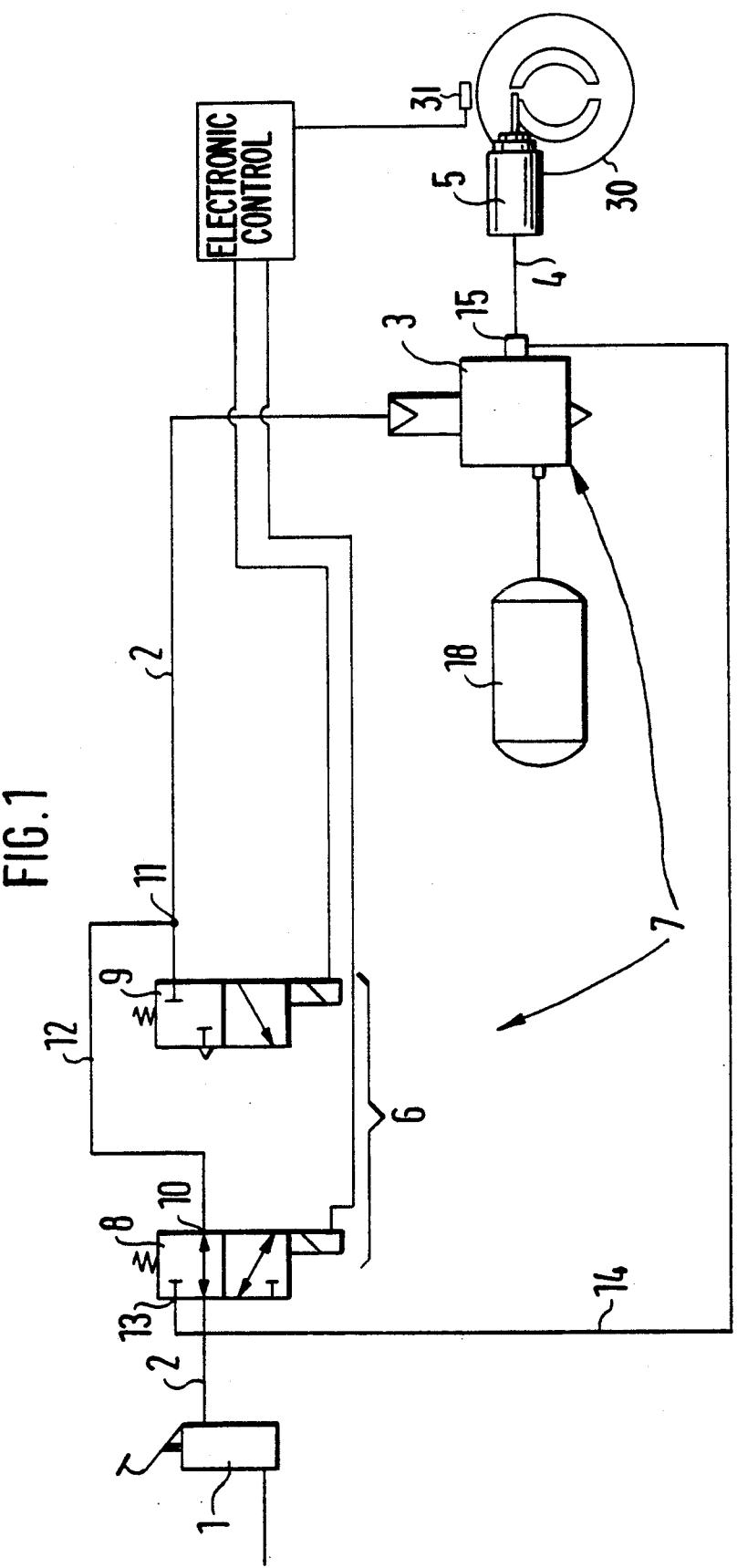
FIG. 1 shows a switch unit comprising two magnetic valves and one relay valve.

An air brake system has a brake control valve 1 which via a control line 2 is connected to a relay valve 3. The relay valve 3 includes a housing 30 including an upper chamber 31, middle chamber 32, and a lower chamber 33. The middle chamber and lower chamber are separated by a partition 34 which has a central cylindrical aperture 35 with a valve seat 36 on the lower side of the aperture in the partition. A spring 37 loaded cylinder 38 extends from a ring support 39 secured in a groove in the wall of the housing toward the valve seat 36 and the upper end of the cylinder 38 is provided with a second valve seat 41 which is supported on an outwardly extending flange 41 of the cylinder 38. A spring-loaded pressure release valve 42 is positioned in the bottom of the lower chamber 33 for releasing air under pressure to the atmosphere upon release of the brakes. A control piston 43 extends from and is axially movable in an upper cylindrical portion 44 of the housing toward the second valve seat 40 and in its normal non-pressure position the lower end of the piston is spaced from the second valve seat so that the second valve seat seats on the first valve seat 36 of the partition. The lower end of the piston has a smaller diameter than that of the cylindrical aperture 36 so that a spacing is left between the end of the piston and the aperture wall. When in the non-braking position the bottom end of the piston is spaced from the second valve seat by use of a spring 45 which compresses to pull the lower end of the piston away from the second valve seat up to a stop shoulder 46. The bottom end of the piston remains in the aperture 35 which acts as a guide for the lower end of the piston. A second partition 47 is formed as an integral part of the piston 43 to form chambers 31 and 32. The partition 47 extends to the cylinder wall and a seal 48 is provided to prevent fluid flow along the cylinder wall between chambers 31 and 32. The second partition includes a pair of one-way valves 49, 50 which control air flow from chamber 31 to chamber 32 and vice versa. The relay valve 3 receives supply pressure from a supply tank 18, and from the relay valve 3 a brake line 4 leads to a brake cylinder 5 which actuates the brakes for the wheels 30. A well known sensor 31 is positioned near the wheels to detect a skid situation. The relay valve 3 in a non-braking control position releases air from the line 4 and brake cylinders to the atmosphere via the cylinder 38 and the pressure release valve 42. In the non-braking condition the spring-loaded second valve seat 40 closes against the partition valve seat 36 and the lower end of the piston 43 is spaced from the second valve seat which prevents flow of fluid from the supply tank to the wheel cylinders. When the second valve seat 40 is closed against the valve seat 36, air is permitted to flow out of chamber 32 and the brake cylinder through the cylinder 38 and the pressure release valve. When the brakes are applied, air is directed to the upper chamber 31 which forces the bottom of the piston 43 against the second valve seat 40 to prevent air from escaping via the pressure release valve 42 and to permit air to flow from the tank 18 to the outlet line 4.

The relay valve 3 is intended for cooperation with a magnetic valve device 6 and with it forms a switch unit 7. The magnetic valve device 6 comprises a 3/2-way inlet magnetic valve 8 and a 2/2-way output magnetic valve 9. The two valves 8 and 9 are connected to one another via a line 12, which is a segment of the control line 2. The line 12 leads from an outlet 10 of the 3/2-way inlet magnetic valve 8 to a connecting point 11 downstream of the 2/2-way outlet magnetic valve 9.

The 3/2-way inlet magnetic valve 8 has a valve-monitored outlet 13, from which according to the invention an additional connecting line 14 leads to a connection 15 for the brake line 4 on the relay valve 3.

Mode of Operation

Upon actuation of the brake valve 1, compressed air is fed into the control line 2, 12. At this time the two magnetic valves 8 and 9 are in their position shown, without current, in which position fluid passes through magnetic valve 8 to the connection 11 and on to the control of valve 3. The relay valve 3 is switched over in the braking direction, and compressed air flows from the supply tank 18 via the relay valve 3 to the brake valve 5 and braking occurs. A compressor is used to replenish braking fluid to the supply tank 18.

If the brake pressure becomes so high that a locking or skid limit is attained, the sensor sends a signal to an electronic signal processing means and then both magnetic valves 8 and 9 receive current via the electronic signal processing means and are switched over. The control lines 2 and 12 and the connecting line 14 are bled via the outlet magnetic valve 9, since the magnetic valve 8 is switched over to prevent flow of fluid from the brake control valve. The valve 8 will permit flow of fluid from line 14 via the line 12 to the outlet valve 9.

Once the danger of locking has been overcome, the outlet magnetic valve 9 is switched off again, and the control pressure can either be maintained with the inlet magnetic valve 8 provided with current, or pressure can be refurnished by the brake valve 1 with the inlet magnetic valve 8 free of current.

By the short-circuiting of the brake pressure with the control pressure during the pressure maintenance phase, the brake pressure attains its applicable maximum value much earlier, and even upon control pressure reduction, the brake pressure follows the control pressure very precisely.

This avoids "lagging" of the brake pressure with respect to the control pressure. It is also clear that the pressure gradient in the control chamber of the relay valve 3 need not be adapted to the pressure gradient of the brake pressure. As a result, a substantially higher pressure gradient can be realized in the control chamber, and accordingly with the then greater controlling of the relay valve 3, a higher pressure gradient results in the brake line 4 as well. Because of the largely lag-free, substantially more-direct control, the same ABS control algorithm can be used in the electronic signal processing means as in control units belonging to the prior art. Accordingly the novel control can be achieved without needing to modify known electronic signal processing units that have been conventional up to now.

Figure 2:
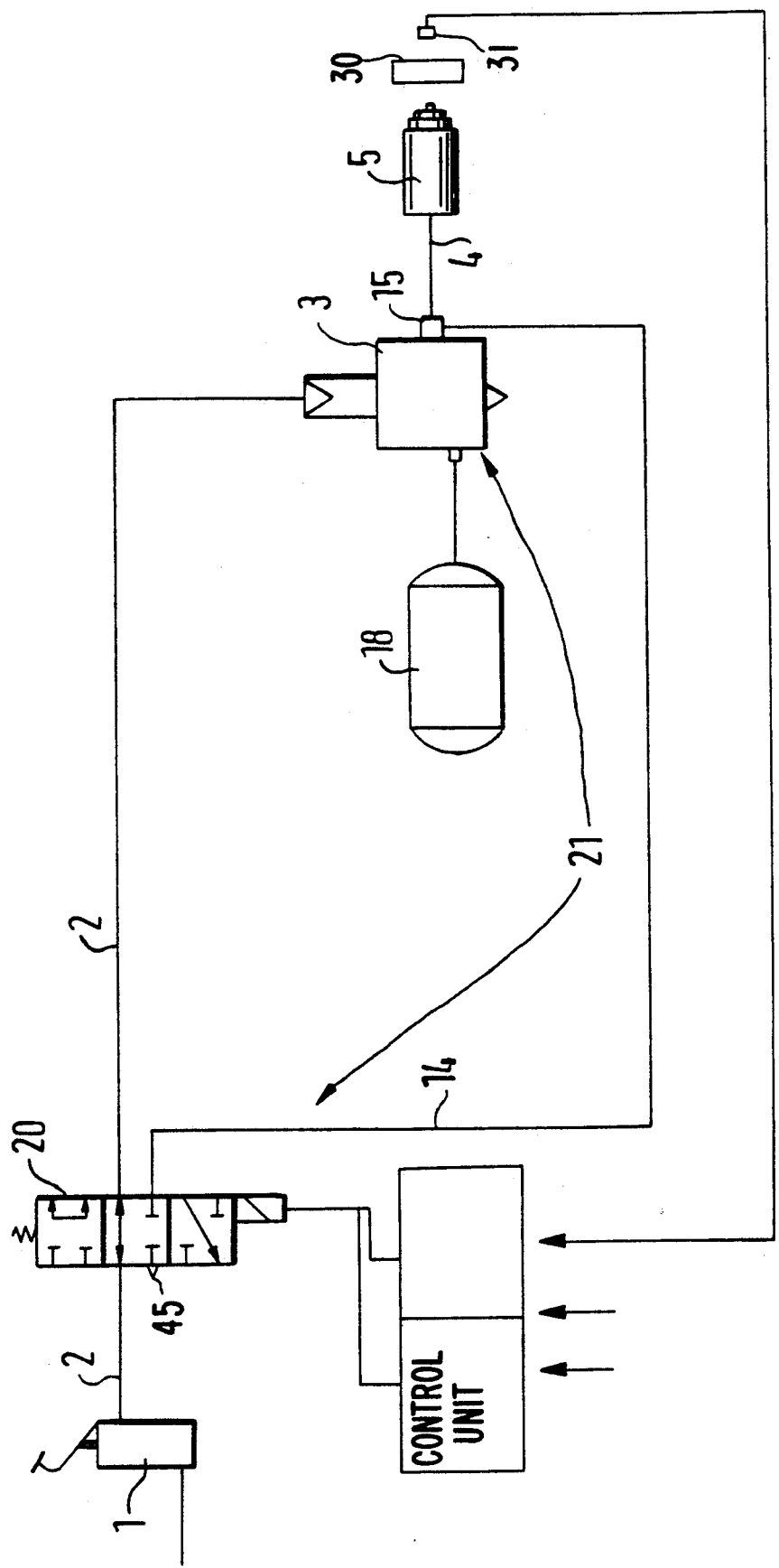
FIG. 2 shows a similar switch unit with a 3/3-way magnetic valve.
Figure 6:
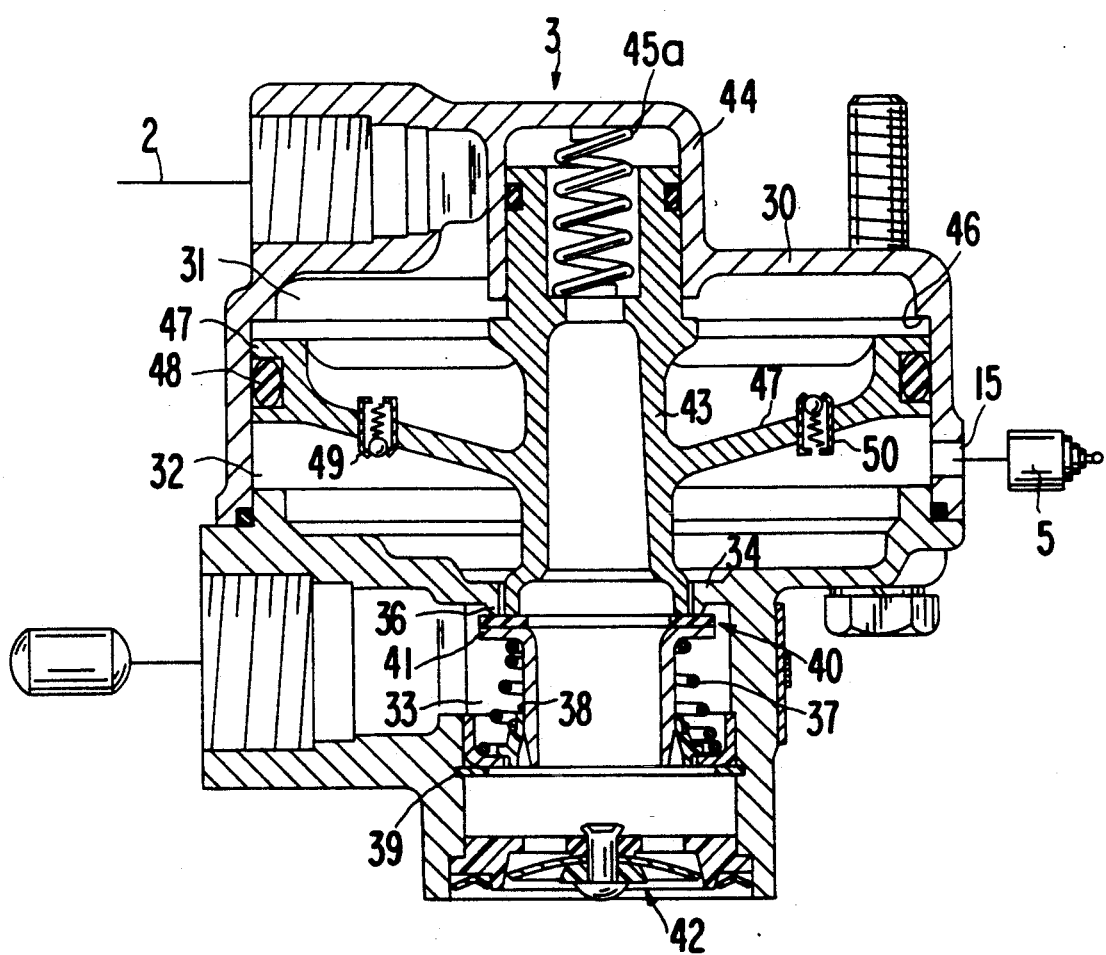
FIG. 6 is a cross sectional view of a relay valve for controlling air pressure to the brakes.

FIG. 2 shows an air brake system identical to FIG. 1, except that here only a 3/3-way magnetic valve 20—as is conventional in anti-skid brake systems—is used as the magnetic valve device. This magnetic valve 20 is triggerable with two different current intensities, in order to move it into its second and third positions. The mode of operation of the magnetic valve 20 is such that without any current application, the fluid passes through the valve to the control valve 3 for actuation of control valve 3 which permits flow of fluid from tank 18 to the brake cylinder. If a skid occurs the valve 20 is switched over to release fluid via lines 2 and 14 to the atmosphere via the air outlet 45 represented by the triangle. The valve 20 can then be switched to the third position which connects line 14 to line 2 for automatic application of fluid to valve 3 which again controls the brakes. During normal operation the valve 20 is switched to its no current position.

FIG. 3 shows an air brake system in which the same reference numerals as in FIGS. 1 and 2 are used for equivalent parts. Here, however, in the control line 2 a 5/2-way magnetic valve 22 is provided as an outlet valve and a 3/2-way magnetic valve 23 is provided as an inlet valve. The two magnetic valves 22 and 23 form a magnetic valve device 24 and together with the relay valve 3 form a switch unit 25.

The mode of operation of this type device is similar to that of FIGS. 1 and 2. In anti-skid braking, however, there are expanded functions, which are shown in the table of FIG. 4. In that table the symbols given have the following meaning:

EV = inlet valve 23
AV = outlet valve 22
0 = off and
1 = on.

It can be seen that the following functions are attainable:

| | | |
|---|---|---|
| EV = 0 | AV = 0 | pressure buildup |
| EV = 1 | AV = 0 | pressure maintenance |
| EV = 1 | AV = 1 | pressure maintenance with pressure equalization |
| EV = 0 | AV = 1 | pressure reduction |

With such valve functions, it is possible to short-circuit the control pressure and brake pressure at the onset of the pressure maintenance phase, and to keep the control pressure constant after a pressure equalization between the brake pressure and the control pressure. This has the advantage that in the event of a pressure loss of the brake cylinder, for instance because of a leak, the brake pressure does not drop; instead, the brake pressure is repeatedly readjusted by the control pressure, which is kept constant.

A further improvement in the operation of the brake system can be attained by providing that a relay piston 43 is used in the relay valve 3; this piston has one passage from a control pressure chamber to a brake pressure chamber, and another from the brake pressure chamber to the control pressure chamber, each passage being controlled as a function of pressure by a respective check valve 49 and 50. This kind of relay valve construction is the subject or a patent application filed under Serial No. P 39 28 388.7 in the Federal German Patent Office. With this kind of construction, the differential pressure occurring between the control pressure chamber and the brake pressure chamber is limited to a differential pressure that is necessary for the controlling of the relay valve. As a result, a pressure equalization in the maintenance phase comes about faster, and above all the maintenance phase prior to the first wheel intrusion upoon wheel speed is improved; that is, the depth of the first intrusion upon wheel speed is lessened when regulation begins. An equivalent pressure course is shown in FIG. 5 as a curve 26.

The foregoing relates to referred exemplary embodiments of the invention, it being understood that other variants and embodiments thereof are possible within the spirit and scope of the invention, the latter being defined by the appended claims.

What is claimed and desired to be secured by Letters Patent of the United States is:

1. An air brake system having an anti-skid apparatus, including an electronic signal processing means and sensors for detecting wheel rotation as well as a skid, a brake control valve (1), a magnetic valve device (6), a relay valve (3), a supply tank (18) connected to said relay valve (3) and wheel brake cylinders (5) connected to said relay valve (3), said brake control valve being connected via a first air flow line (2) to said magnetic valve device which is connected to a brake control means of said relay valve (3) via a second air flow lines (12, 2) for controlling fluid flow from said supply tank to said brake cylinders via said relay valve (3), a third air flow line (4) being disposed between said relay valve and said wheel cylinders, a fourth air flow line (14) connected to said third air flow line (4) and to said magnetic valve device, said magnetic valve device being arranged to receive switching pulses from said electronic signal processing means of the anti-skid apparatus to effect a pressure change in a pressure being maintained in said air brake system, air flow through said fourth air flow line (14) being controlled by the magnetic valve device for controlling the control pressure delivered via the relay valve (3) for actuating the wheel cylinders (5).

2. An air brake system as defined by claim 1, in which said magnetic valve device (6) includes one 2/3-way magnetic valve (8) and one 2/2-way magnetic valve (9).

3. An air brake system as defined by claim 2, in which said 2/2-way magnetic valve (9) is actuated by application of a current to function as an outlet valve during a skid control and is closed when without current applied thereto.

4. An air brake system as defined by claim 1, in which said magnetic valve device (20) is a 3/3-way magnetic valve which is triggerable with different current intensities in order to attain second and third positions for control of a skid.

5. An air brake system as defined by claim 1, in which said magnetic valve device (24) includes one 5/2-way magnetic valve (22) and one 3/2-way magnetic valve (23), which valves can be selectively operated to control pressure buildup, pressure maintenance, pressure maintenance with pressure equalization at the brake cylinder, and pressure reduction.

6. An air brake system as defined by claim 1, in which said relay valve (3) includes a relay piston that is provided with first and second one-way valves which are opened as a function of pressure to control air flow from a control pressure chamber to a brake pressure chamber and vice versa.

* * * * *